(12) United States Patent
Tsuchizawa (10) Patent No.: US 9,789,927 B2
(45) Date of Patent: Oct. 17, 2017

(54) BICYCLE CONTROL APPARATUS FOR BICYCLE ASSIST DEVICE AND BICYCLE ASSIST DEVICE

(71) Applicant: Shimano Inc., Sakai, Osaka (JP)

(72) Inventor: Yasuhiro Tsuchizawa, Osaka (JP)

(73) Assignee: Shimano Inc., Osaka (JP)

( * ) Notice: Subject to any disclaimer, the term of this patent is extended or adjusted under 35 U.S.C. 154(b) by 164 days.

(21) Appl. No.: 14/978,125

(22) Filed: Dec. 22, 2015

(65) Prior Publication Data

US 2016/0207588 A1 Jul. 21, 2016

(30) Foreign Application Priority Data

Jan. 15, 2015 (JP) .................................. 2015-005879

(51) Int. Cl.
*B62M 6/45* (2010.01)
*B62M 25/08* (2006.01)

(52) U.S. Cl.
CPC .............. *B62M 6/45* (2013.01); *B62M 25/08* (2013.01)

(58) Field of Classification Search
CPC .............. B62M 6/40; B62M 6/45; B62M 6/50
See application file for complete search history.

(56) References Cited

U.S. PATENT DOCUMENTS

| | | | | |
|---|---|---|---|---|
| 5,749,429 A * | 5/1998 | Yamauchi | ................ | B62M 6/45 180/206.2 |
| 5,915,493 A * | 6/1999 | Nakayama | ................ | B62M 6/40 180/206.4 |
| 6,296,072 B1 * | 10/2001 | Turner | .................... | B62M 6/55 180/206.2 |
| 6,367,833 B1 * | 4/2002 | Horiuchi | ................ | B62M 9/122 280/260 |
| 7,062,980 B2 * | 6/2006 | Takamoto | .............. | B62M 25/08 73/862.31 |
| 8,360,909 B2 * | 1/2013 | Ichida | .................. | B62M 25/045 474/69 |
| 8,777,804 B2 * | 7/2014 | Takachi | ................ | B60W 20/10 180/206.3 |
| 9,656,722 B2 * | 5/2017 | Tauchi | .................... | B62M 6/45 |
| 9,663,187 B2 * | 5/2017 | Nishikawa | ............... | B62M 6/50 |
| 2005/0246152 A1 * | 11/2005 | Kokatsu | .................. | B62M 6/45 703/22 |
| 2013/0054066 A1 * | 2/2013 | Watarai | .................... | B62M 6/45 701/22 |

(Continued)

FOREIGN PATENT DOCUMENTS

| | | |
|---|---|---|
| JP | 9-272486 A | 10/1997 |
| JP | 11-248566 A | 9/1999 |

*Primary Examiner* — Kevin Hurley
(74) *Attorney, Agent, or Firm* — Global IP Counselors, LLP (57) ABSTRACT

A bicycle control apparatus is provided for controlling a bicycle assist device. The bicycle control apparatus includes a controller that is configured to control an assist motor for assisting a manual drive force of a transmission with a plurality of sprockets. The controller is configured to control the output of the assist motor based on at least one of a rotational speed of a sprocket of the plurality of sprockets and a sprocket dimension in a shift region that is provided to the sprocket when the transmission performs a shifting operation to switch a chain between two of the plurality of sprockets.

22 Claims, 4 Drawing Sheets

(56) References Cited

U.S. PATENT DOCUMENTS

| | | | |
|---|---|---|---|
| 2013/0054067 A1* | 2/2013 | Shoge | B62M 6/45 |
| | | | 701/22 |
| 2014/0166383 A1* | 6/2014 | Arimune | B62M 6/45 |
| | | | 180/206.3 |
| 2015/0120119 A1* | 4/2015 | Tauchi | B62M 6/55 |
| | | | 701/22 |
| 2016/0096589 A1* | 4/2016 | Sato | B62M 25/08 |
| | | | 474/70 |
| 2016/0280328 A1* | 9/2016 | Yamamoto | B62M 11/14 |

* cited by examiner

BICYCLE CONTROL APPARATUS FOR BICYCLE ASSIST DEVICE AND BICYCLE ASSIST DEVICE

CROSS-REFERENCE TO RELATED APPLICATIONS

This application claims priority to Japanese Patent Application No. 2015-005879, filed on Jan. 15, 2015. The entire disclosure of Japanese Patent Application No. 2015-005879 is hereby incorporated herein by reference.

BACKGROUND

Field of the Invention

This invention generally relates to a bicycle control apparatus for a bicycle assist device and a bicycle assist device comprising the bicycle control apparatus.

Background Information

Some bicycles are provided with an assist motor to assist the rider in driving the bicycle. A bicycle control apparatus is often provided to control the assist motor. One example of a bicycle control apparatus for controlling a bicycle assist device is disclosed in Japanese Patent No. 3,717,076, published as JP 2004268854. In this patent, the bicycle control apparatus restricts the output of an assist motor when a bicycle transmission shifts gears, and then releases the restriction on the output of the assist motor based on a prescribed time having elapsed since the start of the restriction on the output of the assist motor.

SUMMARY

Generally, the present disclosure is directed to various features of a bicycle control apparatus. It has been found that the control apparatus disclosed in Japanese Patent No. 3,717,076 does not consider the riding conditions of the bicycle in terms of controlling of the output of the assist motor when shifting gears. Therefore, there is still room for improvement regarding the control of the output of the assist motor.

One object of the present invention is to provide a control apparatus for a bicycle assist device that is capable of appropriately controlling the output of the assist motor, as well as a bicycle assist device that comprises this control apparatus.

In view of the state of the known technology and in accordance with a first aspect of the present disclosure, a bicycle control apparatus is provided for controlling a bicycle assist device. The bicycle control apparatus comprises a controller that is configured to control an assist motor for assisting a manual drive force of a transmission with a plurality of sprockets. The controller is configured to control the output of the assist motor based on at least one of a rotational speed of a sprocket of the plurality of sprockets and a sprocket dimension in a shift region that is provided to the sprocket when the transmission performs a shifting operation to switch a chain between two of the plurality of sprockets.

In accordance with a second aspect of the present invention, the bicycle control apparatus according to the first aspect is configured so that the controller is further configured to selectively restrict the output of the assist motor and release the restriction on the output of the assist motor.

In accordance with a third aspect of the present invention, the bicycle control apparatus according to the second aspect is configured so that the controller is further configured to restrict the output of the assist motor by one of stopping an operation of the assist motor, and reducing the output of the assist motor to be lower than that prior to the restriction of the output of the assist motor.

In accordance with a fourth aspect of the present invention, the bicycle control apparatus according to the second or third aspect is configured so that the controller is further configured to release the restriction on the output of the assist motor by one of returning a ratio of the output of the assist motor with respect to the manual drive force to substantially the same magnitude as that prior to restricting the output of the assist motor, and increasing the ratio to be greater than that after restricting the output of the assist motor.

In accordance with a fifth aspect of the present invention, the bicycle control apparatus according to any one of the second to fourth aspects is configured so that the controller is further configured to control the assist motor so that a time from starting to restrict the output of the assist motor to releasing this restriction becomes shorter as one of the rotational speed of the sprocket and of a rotational speed of a crankshaft that is coupled to the sprocket increases when the transmission switches the chain between two of the plurality of sprockets.

In accordance with a sixth aspect of the present invention, the bicycle control apparatus according to any one of the first to fifth aspects is configured so that the controller is further configured to control the output of the assist motor based on both the rotational speed and the sprocket dimension in the shift region.

In accordance with a seventh aspect of the present invention, the bicycle control apparatus according to the sixth aspect is configured so that the sprocket dimension in the shift region is at least one of a circumferential length between the shift regions that are adjacent in a circumferential direction of the sprocket and an angle between adjacent ones of the shift regions.

In accordance with an eighth aspect of the present invention, the bicycle control apparatus according to the sixth or seventh aspect is configured so that the controller is further configured to determine a time required for shifting from the rotational speed and the sprocket dimension in the shift region, and the controller is further configured to restrict the output of the assist motor according to the determined time.

In accordance with a ninth aspect of the present invention, the bicycle control apparatus according to the eighth aspect is configured so that the shifting operation of the transmission includes an operation of the transmission pushing the chain out in order to change the sprocket to which the chain is hung. The controller is configured to determine that the time that is required for the shift region to pass a prescribed position after the transmission pushes the chain is the time required for shifting.

In accordance with a tenth aspect of the present invention, the bicycle control apparatus according to the eighth or ninth aspect is configured so that the shift region includes a first shift region that is used for an upshift operation of the transmission, and the time required for shifting includes a first time that is required for the upshift operation of the transmission.

In accordance with an eleventh aspect of the present invention, the bicycle control apparatus according to any one of the eighth to tenth aspects is configured so that the shift region includes a second shift region that is used for a downshift operation of the transmission, and the time required for shifting includes a second time that is required for the downshift operation of the transmission.

In accordance with a twelfth aspect of the present invention, the bicycle control apparatus according to the sixth or seventh aspect is configured so that the controller is configured to determine a rotational angle of one of the sprocket that is required for shifting and a rotational angle of a crankshaft based on the sprocket dimension in the shift region, and the controller is configured to restrict the output of the assist motor according to the rotational angle that was determined.

In accordance with a thirteenth aspect of the present invention, the bicycle control apparatus according to the twelfth aspect is configured so that the shifting operation of the transmission includes an operation of the transmission pushing the chain out in order to change the sprocket to which the chain is hung. The controller is configured to determine the rotational angle required for shifting as one of a maximum rotational angle of the sprocket and a maximum rotational angle of the crankshaft that is required for the shift region to pass a prescribed position after the transmission pushes the chain out.

In accordance with a fourteenth aspect of the present invention, the bicycle control apparatus according to the twelfth or thirteenth aspect is configured so that the shift region includes a first shift region that is used for an upshift operation of the transmission, and the controller is configured to determine a time required for shifting based on a first rotational angle that is required by the transmission for the upshift operation.

In accordance with a fifteenth aspect of the present invention, the bicycle control apparatus according to any one of the twelfth to fourteenth aspects is configured so that the shift region includes a second shift region that is used for a downshift operation of the transmission, and the controller is configured to determine a time required for shifting based on a second rotational angle that is required by the transmission for the downshift operation.

In accordance with a sixteenth aspect of the present invention, the bicycle control apparatus according to any one of the first to fifteenth aspects is configured so that the controller is configured to control the output of the assist motor before the transmission shifts gears.

In accordance with a seventeenth aspect of the present invention, the bicycle control apparatus according to any one of the first to sixteenth aspects is configured so that the controller is configured to control the output of the assist motor based on a detection result of a sensor for detecting an operation of a shift operation device for operating the transmission.

In accordance with an eighteenth aspect of the present invention, the bicycle control apparatus according to any one of the first to seventeenth aspects is configured so that the sprocket is a front sprocket, and the transmission is a front transmission.

In accordance with a nineteenth aspect of the present invention, the bicycle control apparatus according to the eighteenth aspect is configured so that the sprocket is configured to rotate synchronously with a crankshaft.

In accordance with a twentieth aspect of the present invention, the bicycle control apparatus according to the eighteenth aspect is configured so that the sprocket is configured to rotate asynchronously with a crankshaft.

In accordance with a twenty-first aspect of the present invention, the bicycle control apparatus according to any one of the first to twentieth aspects is configured so that the assist motor provides a drive force to the sprocket.

In accordance with a twenty-second aspect of the present invention, a bicycle assist device comprises a bicycle control apparatus according to any one of the first to twenty-first aspects further comprises the assist motor.

Also other objects, features, aspects and advantages of the disclosed bicycle control apparatus will become apparent to those skilled in the art from the following detailed description, which, taken in conjunction with the annexed drawings, discloses one embodiment of the bicycle control apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
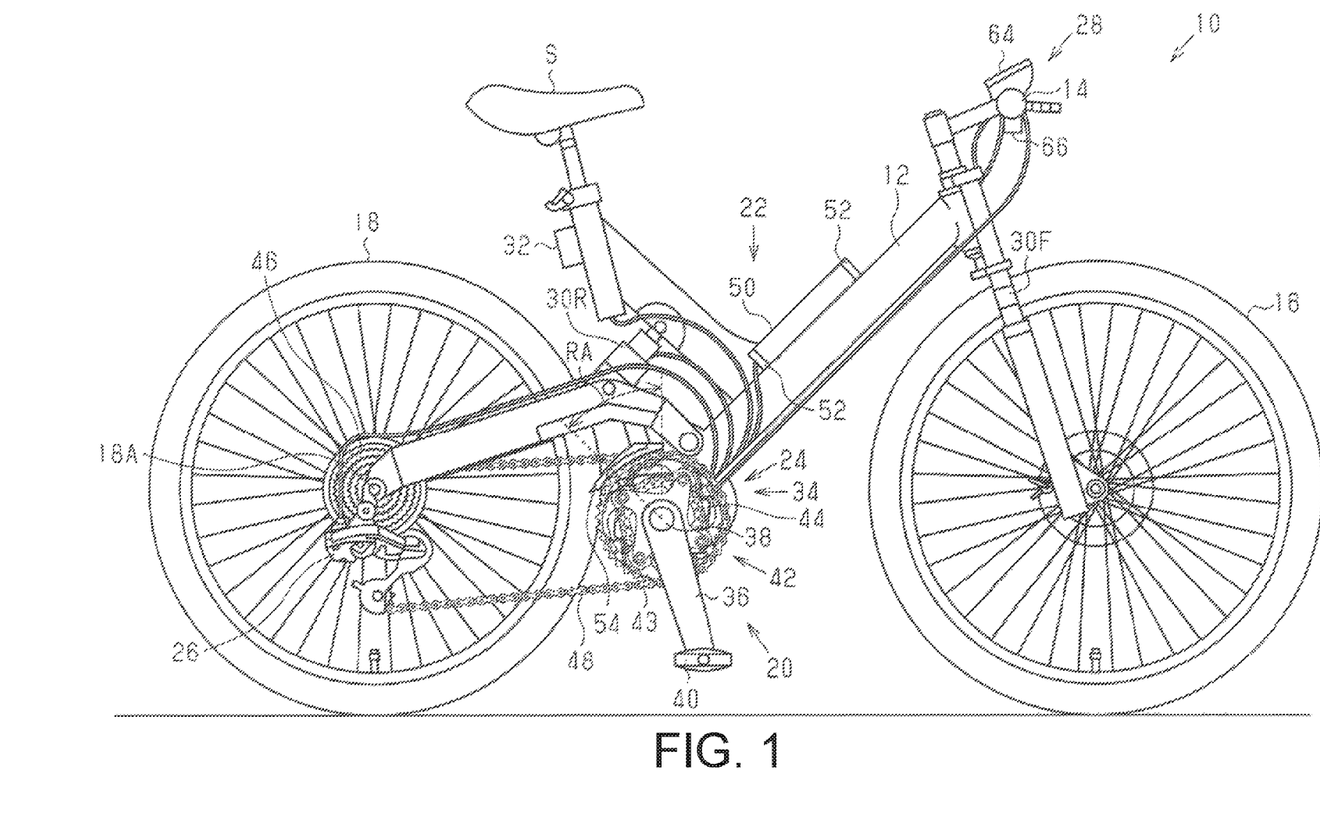
FIG. 1 is a side elevational view of a bicycle equipped with a bicycle assist device having a bicycle control apparatus in accordance with one illustrated embodiment.

Referring initially to FIG. 1, a bicycle 10 is illustrated that is configured in accordance with a first embodiment. The bicycle 10 basically comprises a frame 12, a handlebar 14, a front wheel 16, a rear wheel 18, a drive mechanism 20, a battery unit 22, a front transmission 24, a rear transmission 26, an operating device 28, a pair of suspension adjustment devices 30F and 30R, a seat adjustment device 32 and an assist device 34.

The drive mechanism 20 comprises a pair of crank arms 36, a crankshaft 38, a pair of pedals 40, a front sprocket assembly 42, a rear sprocket assembly 46 and a chain 48.

Figure 4:
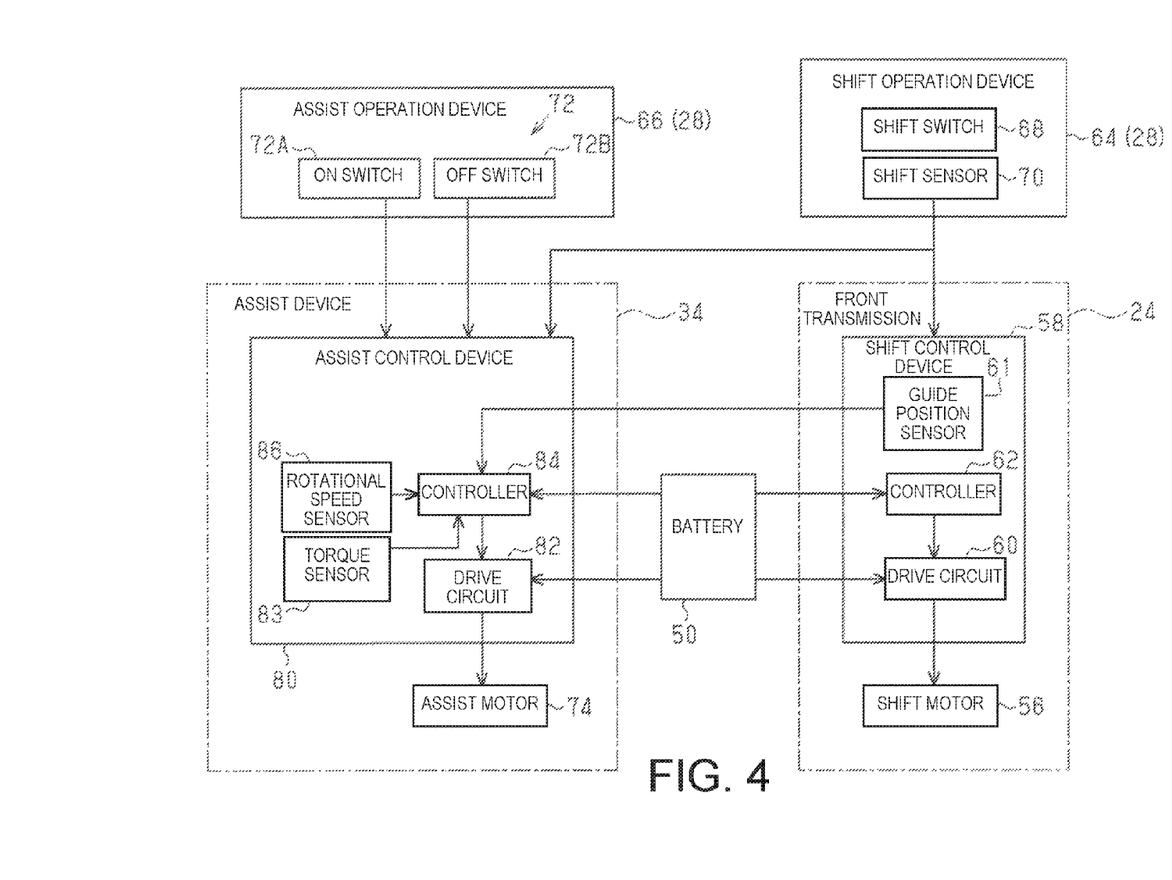
FIG. 4 is a simplified block diagram showing an overall electrical configuration of the bicycle in illustrated FIGS. 1.

The crank arms 36 are rotatably attached to the frame 12 via one crankshaft 38. The crankshaft 38 is rotatably supported by the assist device 34. The assist device 34 is supported by the frame 12. The assist device 34 comprises an output unit that is coupled to the crankshaft 38. As seen in FIG. 4, a torque sensor 83 is provided on a power transmission path between the crankshaft 38 and the output unit for detecting the manual drive force. The output unit of the assist device 34 is formed in a tubular shape, and the crankshaft 38 and the output unit are provided coaxially. The crankshaft 38 and the output unit are non-rotatably coupled. For this reason, the front sprocket assembly 42 rotates synchronously with the crankshaft 38. The pedals 40 are attached to the free ends the crank arms 36 so as to be rotatable around a pedal shaft.

The front sprocket assembly 42 is coupled to the output unit of the assist device 34. The front sprocket assembly 42 is provided coaxially with the crankshaft 38. The front sprocket assembly 42 is coupled so as not to rotate relative to the crankshaft 38. The front sprocket assembly 42 comprises a plurality of sprockets. In the present embodiment, the front sprocket assembly 42 comprises a first front sprocket 43 and a second front sprocket 44.

The rear sprocket assembly 46 is rotatably attached around an axle 18A of the rear wheel 18. The rear sprocket assembly 46 comprises a plurality of rear sprockets. The rear sprocket assembly 46 is coupled with the rear wheel 18 via a one-way clutch (not shown). The rear sprocket assembly 46 comprises a plurality of sprockets. In the present embodiment, the rear sprocket assembly 46 comprises, for example, ten sprockets.

The chain 48 is wrapped onto one of the front sprockets 43 and 44 of the front sprocket assembly 42 and one of the rear sprockets of the rear sprocket assembly 46. When the crank arm 36 rotates due to the manual drive force that is applied to the pedals 40, the rear wheel 18 is rotated by the front sprocket assembly 42, the chain 48, and the rear sprocket assembly 46.

The battery unit 22 comprises a battery 50 and a holder 52 for detachably attaching the battery 50 to the frame 12. The battery 50 comprises one or a plurality of battery cells (not shown). The battery 50 is a rechargeable battery. The battery 50 supplies power to the suspension adjustment devices 30F and 30R, the seat adjustment device 32, a shift control device 58 (see FIG. 4), and an assist control device 80 (see FIG. 4).

The front transmission 24 and the rear transmission 26 are external-type transmissions.

The operating device 28 is attached to the handlebar 14.

The suspension adjustment device 30F adjusts at least one of the damping, there bound, the hardness, and the height of the front suspension of the bicycle 10 steplessly or in a stepwise manner. The suspension adjustment device 30R adjusts at least one of the damping, there bound, the hardness, and the height of the rear suspension of the bicycle 10 steplessly or in a stepwise manner. Power is supplied to the suspension adjustment devices 30F and 30R from the battery 50. The operating device 28 comprises an operating member for operating the suspension adjustment devices 30F and 30R. The suspension adjustment devices 30F and 30R operate in response to the operation of the operating device 28. The operating member is realized by, for example, a switch.

The seat adjustment device 32 adjusts the height of a saddle S of the bicycle 10 steplessly or in a stepwise manner. Power is supplied to the seat adjustment device 32 from the battery 50. The seat adjustment device 32 comprises a telescoping mechanism for extending and retracting the seatpost. The telescoping mechanism can extend and retract the seatpost with a motor, or this mechanism can be configured to extend and retract the seatpost hydraulically or pneumatically. In the case of employing a configuration in which the seatpost is extended and retracted hydraulically or pneumatically, the seat adjustment device 32 controls only the valve while the height of the saddle S is adjusted by the rider. The operating device 28 comprises an operating unit for operating the seat adjustment device 32. The seat adjustment device 32 operates in response to an operation of the operating device 28. The operating unit is realized by, for example, a switch.

Figure 2:
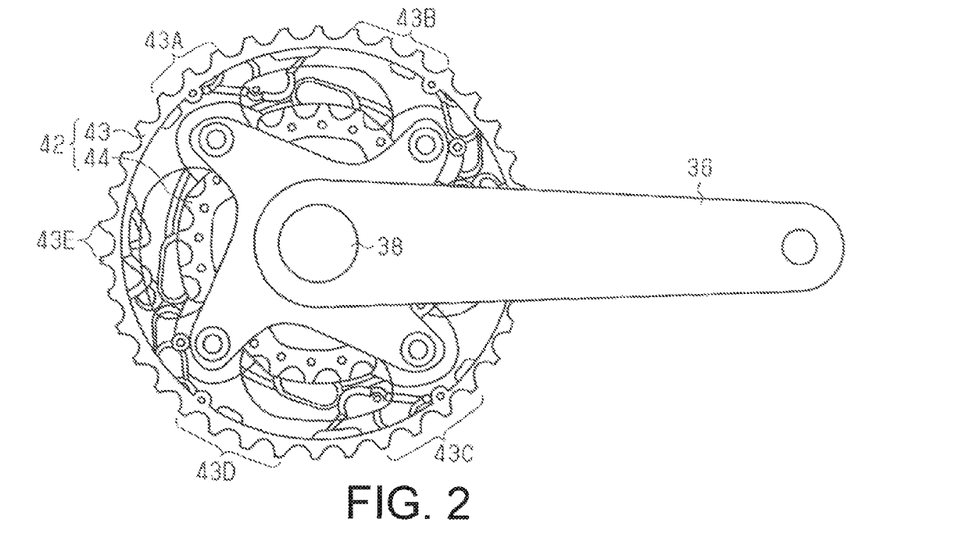
FIG. 2 is an outside elevational view of a front crank assembly with a pair of front sprockets used in the bicycle illustrated in FIG. 1.
Figure 3:
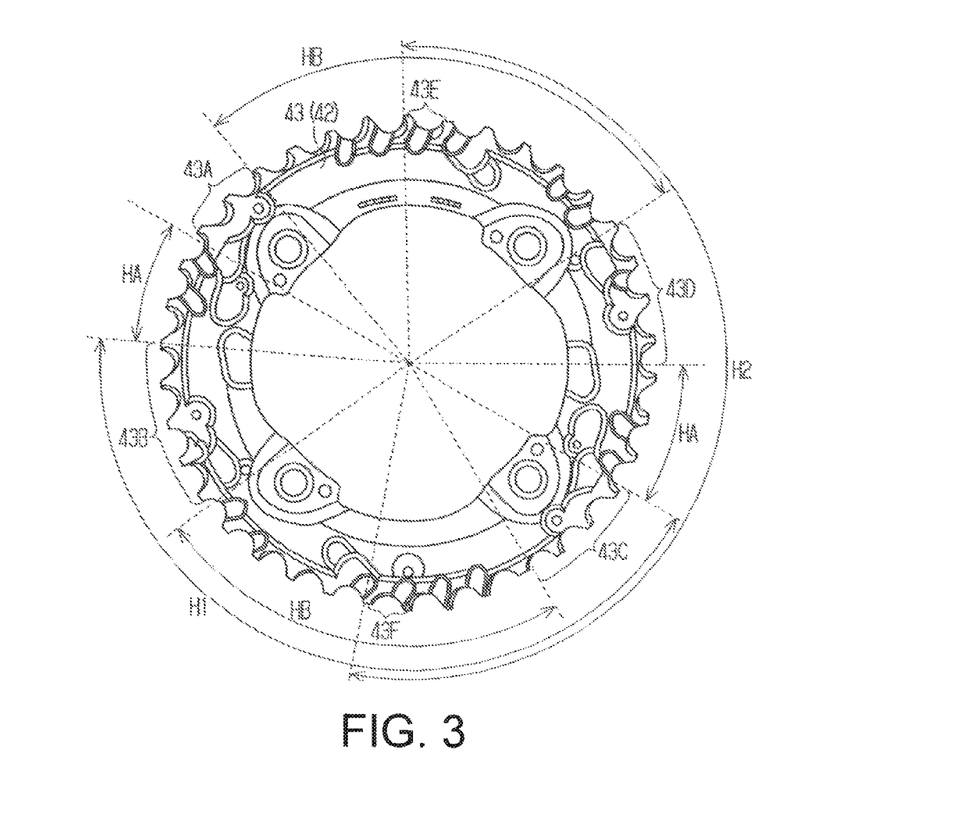
FIG. 3 is an inside elevational view of a first front sprocket of the front crank assembly illustrated in FIG. 2.

The configuration of the front sprockets 43 and 44 will be explained with reference to FIGS. 2 and 3.

Each of the first front sprocket 43 and the second front sprocket 44 have a plurality of teeth that are circumferentially arranged around the peripheral edge of the first front sprocket 43 and the second front sprocket 44. The first front sprocket 43 is larger in diameter than the second front sprocket 44. The first front sprocket 43 and the second front sprocket 44 have a different number of teeth from each other. The first front sprocket 43 has a plurality of shift regions formed by the teeth. In particular, the first front sprocket 43 comprises four first shift regions 43A to 43D and two second shift regions 43E and 43F.

The first shift regions 43A to 43D are utilized for a shifting operation (hereinafter referred to as the "upshift operation") in which the chain 48 (see FIG. 1) is switched from the second front sprocket 44 to the first front sprocket 43 by a chain guide 54 (see FIG. 1) of the front transmission 24. The first front sprocket 43 includes at least one of a recess and a projection formed in each of the first shift regions 43A-43D for guiding the chain 48 to the teeth of the first front sprocket 43. The first shift regions 43A-43D are formed at prescribed intervals in the circumferential direction of the first front sprocket 43. The circumferential length HA between the first shift region 43A and the first shift region 43B is equal to the circumferential length HA between the first shift region 43C and the first shift region 43D. The circumferential length HB between the first shift region 431) and the first shift region 43A is equal to the circumferential direction HB between the first shift region 43B and the first shift region 43C. The circumferential length FIB is longer than the circumferential length HA.

The second shift regions 43E and 43F are utilized for a shifting operation (hereinafter referred to as the "downshift operation") in which the chain 48 (see FIG. 1) is switched from the first front sprocket 43 to the second front sprocket 44 by the chain guide 54 (see FIG. 1) of the front transmission 24. The second shift regions 43E and 43F are formed at prescribed intervals in the circumferential direction of the first front sprocket 43. The second shift region 43E is formed, as one example, in a position in which the phase is shifted 180° from the second shift region 43F in the circumferential direction of the first front sprocket 43.

In an upshift operation, the chain 48 is switched when one shift region from among the four shift regions 43A-43D passes a shifting range RA (see FIG. 1) of the front sprocket assembly 42. The shifting range RA is a range that includes a position in which the chain guide 54 pushes out the chain 48 (see FIG. 1) and that corresponds to the "prescribed range". The shifting range RA is determined along with the position to which the front transmission 24 (see FIG. 1) pushes out the chain 48 when shifting gears.

On the other hand, in a downshift operation, the chain 48 is switched when one shift region from among the two shift regions 43E, 43F passes the shifting range RA.

The electrical configuration of the bicycle 10 will be explained with reference to FIG. 4.

The front transmission 24 comprises a gear shift motor 56 (see FIG. 1) and a shift control device 58. As seen in FIG. 1, the gear shift motor 56 is configured to drive the chain guide 54. The shift control device 58 is configured to control the output of the gear shift motor 56.

The shift control device 58 comprises a drive circuit 60, a guide position sensor 61 and a controller 62. The drive circuit 60 is connected to the gear shift motor 56. The guide position sensor 61 is configured to detect the position of the chain guide 54. The controller 62 is configured to control the power that is supplied to the drive circuit 60.

The operating device 28 comprises a shift operation device 64 and an assist operation device 66.

The shift operation device 64 comprises a shift switch 68 and a shift sensor 70. The shift sensor 70 outputs a shift request signal to the shift control device 58 and an assist control device 80 of the assist device 34, based on the fact that the shift switch 68 has been operated. The shift switch 68 comprises a first shift switch for upshifting and a second shift switch for downshifting (both not shown). The shift switch 68 can be a push-button switch or a lever-type switch.

The assist operation device 66 comprises an assist switch 72. The assist switch 72 comprises an ON switch 72A and an OFF switch 72B. The ON switch 72A outputs an assist request signal to the assist control device 80 when operated. The OFF switch 72B outputs an assist stop signal to the assist control device 80 when operated. The assist switch 72 can also be configured to selectively output an assist request signal or an assist stop signal via the operation of one switch.

The assist device 34 is electrically connected to the shift operation device 64 and the assist operation device 66. The assist device 34 comprises an assist motor 74 and an assist control device 80. The assist motor 74 is configured to assist the manual drive force that rotates the front sprocket assembly 42 (see FIG. 1). The assist control device 80 is configured to control the output of the assist motor 74. The assist motor 74 is coupled to a power transmission path between the crankshaft 38 and the front sprocket assembly 42 via a one-way clutch and a reduction gear. Thus, the assist motor 74 provides a drive force to the front sprocket assembly 42.

The assist control device 80 comprises a drive circuit 82, a torque sensor 83 and a controller 84. The drive circuit 82 is connected to the assist motor 74. The torque sensor 83 is configured to detect the manual drive force. The controller 84 is configured to control the power that is supplied to the drive circuit 82. Additionally, the assist control device 80 comprises a rotational speed sensor 86 for detecting the rotational speed of the front sprocket assembly 42.

When an assist request signal has been received from the assist operation device 66, the controller 84 drives the assist motor 74 based on the detection result of the torque sensor 83. The controller 84 stops the assist motor 74 based on the fact that an assist stop signal has been received from the assist operation device 66.

The controller 84 executes a motor output control for controlling the output of the assist motor 74 based on the rotational speed of the first front sprocket 43 and the intervals between the shift regions 43A-43F of the first front sprocket 43.

The rotational speed sensor 86 detects the rotational speed of the front sprocket assembly 42 by detecting the rotational speed of at least one of the crankshaft 38 and the front sprocket assembly 42. The rotational speed sensor comprises, for example, a reed switch, and this sensor detects a magnet that is provided to the crankshaft 38 or the front sprocket assembly 42.

Figure 5:
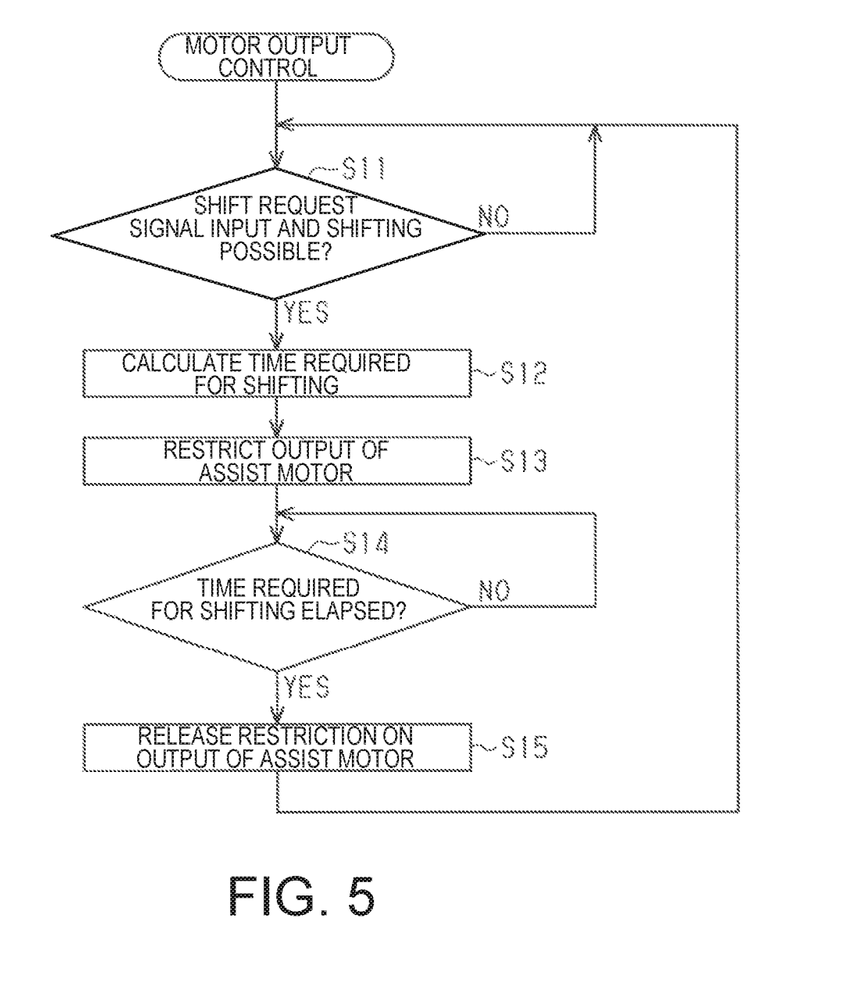
FIG. 5 is a flowchart showing one example of a control operation of the motor output control that is executed by the controller of the assist device in FIG. 1.

One example of a procedure of the motor output control will be explained with reference to FIG. 5. In the present embodiment, a case in which the front transmission 24 performs an upshift operation will be explained. The present control is also executed, based on the same idea, when the front transmission 24 performs a downshift operation.

The controller 84 starts the present control based on the fact that an assist request signal has been received from the assist operation device 66. The controller 84 ends the present control based on the fact that an assist stop signal has been received from the assist operation device 66. The controller 84 includes at least one processor and at least one a memory device with a predetermined software program stored therein for controlling the assist motor 42.

In step S11, the controller 84 determines whether or not a shift request signal has been received from the shift sensor 70 and whether shifting is possible. The controller 84 advances the operation to step S12 when a shift request signal has been received from the shift sensor 70 and a determination has been made that shifting is possible. The controller 84 does not advance the operation to the next step even if a shift request signal has been received and executes the operation of step S11 again when a determination has been made that the chain 48 is on the first front sprocket 43, based on the detection result of the guide position sensor 61. In the case of a downshift operation, in step S11, the controller 84 does not advance the operation to the next step even if a shift request signal has been received and executes the operation of step S11 again when a determination has been made that the chain 48 is on the second front sprocket 44, based on the detection result of the guide position sensor 61.

In step S12, the controller 84 determines the time required for shifting based on the detection result of the rotational speed sensor 86 and the maximum circumferential length, which is the longest circumferential length from among the circumferential lengths of the adjacent first shift regions 43A-43D in the circumferential direction of the first front sprocket 43. In the present embodiment, the maximum circumferential length is the circumferential length HB.

The time required for shifting is a time required for one shift region from among the first shift regions 43A-43D to pass the shifting range RA after the chain guide 54 of the front transmission 24 pushes the chain 48 out.

The controller 84 calculates the time required for shifting based on a first circumferential length H1 that is obtained by adding the circumferential lengths of the two first shift regions with the maximum circumferential length HB (see FIG. 3), a total circumferential length HX of the first front sprocket 43, and a rotational speed V of the first front sprocket 43 (rpm). In this case, the time required for shifting is calculated by dividing H1/HX by V. For this reason, the time required for shifting becomes shorter as the rotational speed of the first front sprocket 43 or of the crankshaft 38 that is coupled to the first front sprocket 43 increases. Information regarding the first circumferential length Hi and the total circumferential length HX is stored beforehand in a memory of the controller 84. In the case that the front transmission 24 performs a downshift operation, the controller 84 uses a circumferential length between the second shift region 43E and the second shift region 43F as the maximum circumferential length in step S12. The time required for shifting when the front transmission 24 performs a downshift operation is a time required for one shift region from among the second shift regions 43E and 43F to pass the shifting range RA after the chain guide 54 of the front transmission 24 pushes the chain 48 out. For example, the controller 84 calculates the time required for shifting based on a second circumferential length H2 that is obtained by adding the circumferential lengths of the two second shift regions with the circumferential length between the second shift region 43E and the second shift region 43F (see FIG. 3), the total circumferential length HX of the first front sprocket 43, and the rotational speed V of the first front sprocket 43 (rpm). In this case, the time required for shifting is calculated by dividing H2/HX by V. Information regarding the second circumferential length H2 and the total circumferential length HX is stored beforehand in a memory of the controller 84.

In step S13, the controller 84 restricts the assisting force by reducing the output of the assist motor 74. The controller 84 determines the magnitude of the output of the assist motor 74 based on the output of the assist motor 74 prior to restricting the output of the assist motor 74. The controller 84 increases the reduction amount of the output of the assist motor 74 as the output of the assist motor 74 prior to the restriction of the output of the assist motor 74 increases.

In step S14, the controller 84 determines whether or not the time required for shifting has elapsed since initiating the restriction on the output of the assist motor 74. The controller 84 advances the operation to step S15 when a determination has been made that the time required for shifting has elapsed.

The controller 84 releases the restriction on the output of the assist motor 74 in step S15. For example, the controller 84 releases the restriction on the output of the assist motor 74 by returning the ratio of the output of the assist motor 74 with respect to the manual drive force to substantially the same magnitude as that prior to restricting the output of the assist motor 74; then, the operation proceeds to step S11. The expression "substantially the same magnitude" as used herein means an amount of deviation such that the magnitude is not noticeable to the rider.

The action and effects of the assist control device 80 will be described.

The controller 84 of the assist control device 80 controls the output of the assist motor 74, based on the rotational speed of the first front sprocket 43 and the intervals between the shift regions 43A-43F, when a shift request signal has been received, in other words, when the front transmission 24 performs a shifting operation. In this way, the controller 84 controls the output of the assist motor 74 while considering the rotational position of the first front sprocket 43, which is one example of a riding condition of the bicycle 10; therefore, more appropriately controlling the output of the assist motor 74 is possible.

The assist control device 80 further exerts the following effects.

(1) The controller 84 releases the restriction on the output of the assist motor 74, based on the rotational speed of the first front sprocket 43 and the intervals between the shift regions 43A-43F, when the front transmission 24 performs a shifting operation. For this reason, more appropriately setting the timing to release the restriction on the output of the assist motor 74 is possible.

(2) The controller 84 restricts the output of the assist motor 74 by reducing the output of the assist motor 74 to be lower than that prior to restricting the output of the assist motor 74 when the front transmission 24 performs a shifting operation. The tensile force that acts on the chain 48 when the front transmission 24 performs a shifting operation is thereby reduced. For this reason, the chain 48 can be easily and appropriately switched between the first front sprocket 43 and the second front sprocket 44.

(3) The controller 84 releases the restriction on the output of the assist motor 74 by returning the ratio of the output of the assist motor 74 with respect to the manual drive force to substantially the same magnitude as that prior to restricting the output of the assist motor 74. For this reason, the assisting force is unlikely to change greatly before and after the shifting operation, and stable traveling is possible.

(4) The controller 84 determines the magnitude of the output of the assist motor 74 when restricting the output of the assist motor 74 based on the output of the assist motor 74 prior to the restriction of the output of the assist motor 74. For this reason, more appropriately reducing the output of the assist motor 74, as compared to a case in which the output of the assist motor 74 is always reduced at a constant magnitude, is possible when the front transmission 24 performs a shifting operation.

(5) The controller 84 controls the output of the assist motor 74, based on the rotational speed of the first front sprocket 43 and the intervals between the shift regions 43A-43F, when the front transmission 24 performs a shifting operation. For this reason, more precisely controlling the output of the assist motor 74, as compared to a case in which the output of the assist motor 74 is controlled based on either the rotational speed of the first front sprocket 43 or the intervals between the shift regions 43A-43F, is possible.

(6) The controller 84 determines the time that is required for the shift regions 43A-43F to pass a prescribed position within the shifting range RA after the chain guide 54 of the front transmission 24 pushes the chain 48 out as the time required for shifting. For this reason, the shifting operation can be easily and appropriately completed from the start of the restriction on the output of the assist motor 74 to when the time required for shifting has elapsed.

(7) For example, when restricting the output of the assist motor 74 for a prescribed time based on the fact that a shift request signal has been received, a time that is sufficient for the front transmission 24 to complete an upshift operation or a downshift operation is set as the prescribed time. For this reason, the prescribed time that is set, that is, the time that the output of the assist motor 74 is restricted, tends to become long. On the other hand, the controller 84 calculates the time required for shifting, based on the rotational speed of the first front sprocket 43 and the intervals between the shift regions 43A-43F, and releases the restriction on the output of the assist motor 74, based on the fact that the time required for shifting has elapsed. For this reason, the time that the output of the assist motor 74 is restricted will likely not become long.

The descriptions relating to the above-described embodiments are examples of the forms that the assist device according to the present invention and the control apparatus thereof can take; they are not intended to limit the forms thereof. In addition to the embodiments, the assist device according to the present invention and the control apparatus thereof may take the form of the modified examples of the embodiments described below, as well as forms that combine at least two modified examples that are not mutually contradictory.

The controller 84 of a modified example controls the output of the assist motor 74, based on the rotational speed of the first front sprocket 43 or the intervals between the shift regions 43A-43F, when the front transmission 24 performs a shifting operation. In the case of controlling the output of the assist motor 74 based on the rotational speed of the first front sprocket 43, the controller 84 stores the time needed to decrease the output of the assist motor 74 corresponding to the rotational speed of the first front sprocket 43. The time needed to reduce the output of the assist motor 74 is obtained in advance by experiment and is stored by a memory of the controller 84. The controller 84 controls the assist motor 74 so that the time needed to reduce the output of the assist motor 74 becomes shorter as the rotational speed of the first front sprocket 43 increases when the front transmission 24 performs a shifting operation. The controller 84 can appropriately control the output of the assist motor 74 in accordance with only the rotational speed of the first front sprocket 43 without considering the intervals between the shift regions 43A-43F.

Additionally, in the case of controlling the output of the assist motor 74 based on the intervals between the shift regions 43A-43F, the controller 84 stores the time needed to reduce the output of the assist motor 74 in accordance with the intervals between the shift regions 43A-43F. The time needed to reduce the output of the assist motor 74 is obtained in advance by experiment and is stored by a memory of the controller 84. The controller 84 controls the assist motor 74 so that the time needed to reduce the output of the assist motor 74 becomes longer as the intervals of the shift regions 43A-43F increase when the front transmission 24 performs a shifting operation. For example, when there are three or more front sprockets of the front sprocket assembly 42, the interval of the shift region is different for each sprocket except for the smallest sprocket; however, the controller 84 is able to appropriately control the assist motor 74 to match the intervals between the shift regions 43A-43F.

The controller 84 of a modified example determines a first rotational angle of the crankshaft 38 or a first rotational angle of the first front sprocket 43, which is necessary for an upshift operation, based on the intervals between the first shift regions 43A-43D, the output of the assist motor 74 is restricted according to the determined rotational angle. For example, the controller 84 of this modified example determines the time required for shifting based on the first rotational angle that the front transmission 24 requires for the upshift operation. Meanwhile, the controller 84 of this modified example preferably uses the maximum rotational angle of the front sprocket assembly 42, which is required for one shift region from among the first shift regions 43A-43D to pass the shifting range RA after the chain guide 54 of the front transmission 24 pushes the chain 48 out, as the first rotational angle that is necessary for the upshift operation. This first rotational angle is, for example, selected as an angle that corresponds to the first circumferential length H1. Alternatively, the maximum rotational angle of the crankshaft 38, which is required for one shift region from among the first shift regions 43A-43D to pass the shifting range RA, is preferably used as the first rotational angle that is necessary for the upshift operation. This first rotational angle is, for example, selected as an angle that corresponds to the first circumferential length H1.

The controller 84 of a modified example determines a second rotational angle of the crankshaft 38 or a second rotational angle of the first front sprocket 43 that is necessary for a downshift operation, based on the interval between the second shift regions 43E and 43F, and restricts the output of the assist motor 74 according to the determined rotational angle. For example, the controller 84 of this modified example determines the time required for shifting based on the second rotational angle that the front transmission 24 requires for the downshift operation. Meanwhile, the controller 84 of this modified example preferably uses the maximum rotational angle of the front sprocket assembly 42, which is required for one shift region from among the second shift regions 43E and 43F to pass a prescribed position in the shifting range RA, as the second rotational angle that is necessary for the upshift operation. This second rotational angle is, for example, selected as an angle that corresponds to the second circumferential length H2. Alternatively, the maximum rotational angle of the crankshaft 38, which is required for one shift region from among the second shift regions 43E and 43F to pass a prescribed position in the shifting range RA, is preferably used as the second rotational angle that is necessary for the upshift operation. This second rotational angle is, for example, selected as an angle that corresponds to the second circumferential length H2.

The controller 84 of a modified example stops the operation of the assist motor 74 in step S13 of the motor output control.

The controller 84 of a modified example releases the restriction on the output of the assist motor 74 by increasing the ratio of the output of the assist motor 74 with respect to the manual drive force to be greater than that after restricting the output of the assist motor 74 in step S15 of the motor output control.

The drive mechanism 20 of a modified example comprises three or more front sprockets that have a different number of teeth from each other. The controller 84 that is mounted to the bicycle 10 comprising the drive mechanism 20 of this modified example determines the magnitude of the output of the assist motor 74 when restricting the output of the assist motor 74 according to each of the plurality of shift stages, that is, the plurality of front sprockets of the front sprocket assembly 42, in step S13 of the motor output control. That is, the magnitude of the output of the assist motor 74 when restricting the output of the assist motor 74 is differentiated according to each front sprocket of the front sprocket assembly 42. For example, the controller 84 of this modified example increases the reduction amount of the output of the assist motor 74 when restricting the output of the assist motor 74 more as the number of teeth on the front sprocket of the front sprocket assembly 42 to which the chain 48 is hung prior to the shifting operation increases.

The first front sprocket 43 of a modified example comprises one to three or five or more first shift regions in arbitrary positions along the circumferential direction.

The first front sprocket 43 of a modified example comprises only one or a plurality of first shift regions in arbitrary positions along the circumferential direction.

The first front sprocket 43 of a modified example comprises one, three, or more second shift regions in arbitrary positions along the circumferential direction.

The first front sprocket 43 of a modified example comprises only one or a plurality of second shift regions in arbitrary positions along the circumferential direction.

In the rear sprocket assembly 46 of a modified example, at least either a first shift region or a second shift region is formed on each sprocket, except for the rear sprocket that has the least number of teeth. The controller 84 that is mounted to a bicycle 10 comprising the rear sprocket assembly 46 of this modified example executes a motor output control in a shifting operation of the rear transmission 26 according to the same concept as used in the shifting operation of the front transmission 24.

The bicycle 10 of a modified example comprises a mechanical transmission, a shifter, and a shifter detection sensor.

The mechanical transmission is a front transmission, in which a pantograph is operated according to the winding amount of a shift cable used to switch the chain 48.

The shifter is, for example, attached to the handlebar 14 and winds the shift cable via an operation performed by a rider.

The shifter detection sensor detects that the shifter has been operated by the rider. The shifter detection sensor outputs a shifter operation signal to the controller 84 when a detection has been made that the shifter has been operated by the rider.

The controller 84 that is mounted to the bicycle 10 of this modified example controls the output of the assist motor 74 based on the fact that a shifter operation signal has been received. For example, the controller 84 of this modified example restricts the output of the assist motor 74 before the front transmission 24 starts a shifting operation and executes step S14 and subsequent operations, based on the fact that a shifter operation signal has been received.

The front sprocket assembly 42 of a modified example is coupled to the crankshaft 38 via a one-way clutch so that the front sprocket assembly 42 will roll forward when the crankshaft 38 rolls forward. That is, the front sprocket assembly 42 can be rotated asynchronously with the crankshaft 38.

The time required for shifting may be configured to be the time that is required for a plurality of first shift regions, from among the first shift regions 43A-43D, to pass a shifting range RA. For example, there are cases in which the first shift regions 43A-43D that are adjacent in the circumferential direction are formed in shapes that differ, depending on the phase of the chain 48. In this case, in step S14, improving the precision of shifting is possible by determining that at least two first shift regions have passed the shifting range RA. In this case, for example, the first circumferential length H1 should be configured to be a circumferential length obtained by adding the circumferential length HA, the circumferential length FIB, and the circumferential lengths of the three first shift regions.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A bicycle control apparatus for a bicycle assist device, comprising:
   a controller configured to control an assist motor for assisting a manual drive force of a transmission with a plurality of sprockets,
   the controller being configured to control the output of the assist motor based on at least one of a rotational speed of a sprocket of the plurality of sprockets and a sprocket dimension in a shift region that is provided to the sprocket when the transmission performs a shifting operation to switch a chain between two of the plurality of sprockets.

2. The bicycle control apparatus as recited in claim 1, wherein
   the controller is further configured to selectively restrict the output of the assist motor and release the restriction on the output of the assist motor.

3. The bicycle control apparatus as recited in claim 2, wherein
   the controller is further configured to restrict the output of the assist motor by one of stopping an operation of the assist motor, and reducing the output of the assist motor to be lower than that prior to the restriction of the output of the assist motor.

4. The bicycle control apparatus as recited in claim 2, wherein
   the controller is further configured to release the restriction on the output of the assist motor by one of returning a ratio of the output of the assist motor with respect to the manual drive force to substantially the same magnitude as that prior to restricting the output of the assist motor, and increasing the ratio to be greater than that after restricting the output of the assist motor.

5. The bicycle control apparatus as recited in claim 2, wherein
   the controller is further configured to control the assist motor so that a time from starting to restrict the output of the assist motor to releasing this restriction becomes shorter as one of the rotational speed of the sprocket and of a rotational speed of a crankshaft that is coupled to the sprocket increases when the transmission switches the chain between two of the plurality of sprockets.

6. The bicycle control apparatus as recited in claim 1, wherein
   the controller is further configured to control the output of the assist motor based on both the rotational speed and the sprocket dimension in the shift region.

7. The bicycle control apparatus as recited in claim 6, wherein
   the sprocket dimension in the shift region is at least one of a circumferential length between the shift regions that are adjacent in a circumferential direction of the sprocket and an angle between adjacent ones of the shift regions.

8. The bicycle control apparatus as recited in claim 6, wherein
   the controller is further configured to determine a time required for shifting from the rotational speed and the sprocket dimension in the shift region, and the controller is further configured to restrict the output of the assist motor according to the determined time.

9. The bicycle control apparatus as recited in claim 8, wherein
   the shifting operation of the transmission includes an operation of the transmission pushing the chain out in order to change the sprocket to which the chain is hung, and
   the controller is configured to determine that the time that is required for the shift region to pass a prescribed position after the transmission pushes the chain is the time required for shifting.

10. The bicycle control apparatus as recited in claim 8, wherein
    the shift region includes a first shift region that is used for an upshift operation of the transmission, and
    the time required for shifting includes a first time that is required for the upshift operation of the transmission.

11. The bicycle control apparatus as recited in claim 8, wherein
    the shift region includes a second shift region that is used for a downshift operation of the transmission, and
    the time required for shifting includes a second time that is required for the downshift operation of the transmission.

12. The bicycle control apparatus as recited in claim 6, wherein
    the controller is configured to determine a rotational angle of one of the sprocket that is required for shifting and a rotational angle of a crankshaft based on the sprocket dimension in the shift region, and the controller is configured to restrict the output of the assist motor according to the rotational angle that was determined.

13. The bicycle control apparatus as recited in claim 12, wherein the shifting operation of the transmission includes an operation of the transmission pushing the chain out in order to change the sprocket to which the chain is hung, and the controller is configured to determine the rotational angle required for shifting as one of a maximum rotational angle of the sprocket and a maximum rotational angle of the crankshaft that is required for the shift region to pass a prescribed position after the transmission pushes the chain out.

14. The bicycle control apparatus as recited in claim 12, wherein the shift region includes a first shift region that is used for an upshift operation of the transmission, and the controller is configured to determine a time required for shifting based on a first rotational angle that is required by the transmission for the upshift operation.

15. The bicycle control apparatus as recited in claim 12, wherein the shift region includes a second shift region that is used for a downshift operation of the transmission, and the controller is configured to determine a time required for shifting based on a second rotational angle that is required by the transmission for the downshift operation.

16. The bicycle control apparatus as recited in claim 1, wherein the controller is configured to control the output of the assist motor before the transmission shifts gears.

17. The bicycle control apparatus as recited in claim 1, wherein the controller is configured to control the output of the assist motor based on a detection result of a sensor for detecting an operation of a shift operation device for operating the transmission.

18. The bicycle control apparatus as recited in claim 1, wherein the sprocket is a front sprocket, and the transmission is a front transmission.

19. The bicycle control apparatus as recited in claim 18, wherein the sprocket is configured to rotate synchronously with a crankshaft.

20. The bicycle control apparatus as recited in claim 18, wherein the sprocket is configured to rotate asynchronously with a crankshaft.

21. The bicycle control apparatus as recited in claim 1, wherein the assist motor provides a drive force to the sprocket.

22. A bicycle assist device comprising the bicycle control apparatus as recited in claim 1, and further comprising the assist motor.

* * * * *